United States Patent
Nishikawa et al.

(10) Patent No.: US 6,842,289 B2
(45) Date of Patent: Jan. 11, 2005

(54) MICROLENS ARRAY, MANUFACTURING METHOD THEREOF AND OPTICAL INSTRUMENT

(75) Inventors: Takao Nishikawa, Shiojiri (JP); Atsushi Takakuwa, Shiojiri (JP); Mutsumi Tamura, Suwa (JP)

(73) Assignee: Seiko Epson Corporation (JP)

( * ) Notice: Subject to any disclaimer, the term of this patent is extended or adjusted under 35 U.S.C. 154(b) by 24 days.

(21) Appl. No.: 10/104,984

(22) Filed: Mar. 22, 2002

(65) Prior Publication Data

US 2002/0135883 A1 Sep. 26, 2002

(30) Foreign Application Priority Data

Mar. 23, 2001 (JP) ......................................... 2001-085377

(51) Int. Cl.[7] ........................... G02B 27/10; B29D 11/00
(52) U.S. Cl. ........................ 359/619; 359/620; 359/622; 216/26; 264/1.32
(58) Field of Search ................................ 359/619, 620, 359/621, 622, 628, 708, 710, 624, 623; 216/26; 264/1.32

(56) References Cited

U.S. PATENT DOCUMENTS

| | | | | |
|---|---|---|---|---|
| 5,543,942 A | * | 8/1996 | Mizuguchi et al. | ......... 359/619 |
| 5,548,349 A | * | 8/1996 | Mizuguchi et al. | ......... 348/766 |
| 6,330,112 B1 | * | 12/2001 | Kaise et al. | ................. 359/621 |
| 6,469,832 B2 | * | 10/2002 | Yotsuya et al. | ............. 359/619 |
| 6,535,338 B2 | * | 3/2003 | Nishikawa | ................... 359/619 |
| 2002/0141067 A1 | * | 10/2002 | Takakuwa et al. | .......... 359/619 |

* cited by examiner

Primary Examiner—Georgia Epps
Assistant Examiner—M. Hasan
(74) Attorney, Agent, or Firm—Harness, Dickey & Pierce, P.L.C.

(57) ABSTRACT

A manufacturing method of a microlens array includes the step of forming second light transmitting layers 36 on a first light transmitting layer 26. The first light transmitting layer 26 has a plurality of recessed parts 28 and partitions 32 for delimiting the recessed parts 28, wherein at least a portion of the inner surface of each recessed part 28 is a lens surface 30. The second light transmitting layers 36 are formed in the respective recessed parts 28 in such a manner that the second light transmitting layers 36 avoid the partitions 32 of the first light transmitting layer 26. The second light transmitting layers 36 are formed in such a manner that the surfaces of the second light transmitting layers 36 form lens surfaces 38 for the respective recessed parts 28.

10 Claims, 8 Drawing Sheets

MICROLENS ARRAY, MANUFACTURING METHOD THEREOF AND OPTICAL INSTRUMENT

The present invention relates to a microlens array, a manufacturing method thereof, and an optical instrument.

BACKGROUND OF THE INVENTION

Hitherto, microlens arrays formed by arranging a plurality of microlenses have been applied to, for example, liquid crystal panels. When applying microlens arrays, light entering each of the pixels through each of the microlenses converges, thereby improving the brightness of the display. A method for forming lenses by transferring the shape of a master to a resin is used for manufacturing the microlens arrays, and a method for forming biconvex or biconcave lenses by the above transferring method is also used. However, when the biconvex or biconcave lenses are formed by the transferring method, there is a problem in that aligning the optical axis of the one lens surface with the optical axis of the other lens surface is difficult.

The present invention solves the above problem, and it is an object of the present invention to provide a manufacturing method of a microlens array in which aligning the optical axes of both lens surfaces is easy, a microlens array manufactured thereby, and an optical instrument.

SUMMARY OF THE INVENTION (1) A method for manufacturing a microlens array according to the present invention includes the step of forming second light transmitting layers on a first light transmitting layer, wherein the first light transmitting layer has a plurality of recessed parts and partitions for delimiting the recessed parts, at least a portion of the inner surface of each recessed part being a lens surface, the second light transmitting layers are formed in the respective recessed parts in such a manner that the second light transmitting layers avoid the partitions of the first light transmitting layer, and the second light transmitting layers are formed in such a manner that the surfaces of the second light transmitting layers form lens surfaces for the respective recessed parts of the first light transmitting layer.

According to the present invention, since the second light transmitting layers are formed in the respective recessed parts in such a manner that the second light transmitting layers avoid the partitions of the first light transmitting layer, the lens surfaces of the second light transmitting layers are not formed on the partitions. Thus, the optical axes of both lens surfaces are easily aligned.

In the manufacturing method of the microlens array, the first light transmitting layer may be provided with light transmitting layer precursors thereon, and then the second light transmitting layers may be formed.

In the manufacturing method of the microlens array, the surfaces of the partitions of the first light transmitting layer may include a material having a low affinity for the light transmitting layer precursors, and each surface of the light transmitting layer precursors may form a raised surface for each recessed part by repulsion of the light transmitting layer precursors by the partitions.

According to the above method, the light-transmitting layer precursors repelled by the partitions have respective curved surfaces; hence, lens surfaces are easily formed.

In the manufacturing method of the microlens array, each of the light transmitting layer precursors may be provided in each of the recessed parts by an ink jet process in such a manner that each light transmitting layer precursor protrudes from each recessed part.

In the manufacturing method of the microlens array, the inner surface of each recessed part of the first light transmitting layer may include a material having a low affinity for the light transmitting layer precursors, and each surface of the light transmitting layer precursors may form a raised surface for each recessed part by repulsion of the light transmitting layer precursors by the recessed parts.

According to the above method, the light-transmitting layer precursors repelled by the recessed parts have respective curved surfaces; hence, lens surfaces are easily formed.

In the manufacturing method of the microlens array, each of the light transmitting layer precursors in a gel state may be provided in each of the recessed parts and then may be liquefied by applying energy.

In the manufacturing method of the microlens array, each of the light transmitting layer precursors in a gel state may be provided in each of the recessed parts with a squeegee in such a manner that each light transmitting layer precursor does not surmount each partition.

In the manufacturing method of the microlens array, each of the second light transmitting layers may be formed by placing a lens element having the lens surface into each recessed part of the first light transmitting layer.

In the manufacturing method of the microlens array, the lens surface formed at each recessed part of the first light transmitting layers may be concave.

In the manufacturing method of the microlens array, each recessed part of the first light transmitting layer may have a bottom functioning as a convex lens surface and a wall extending from the bottom.

in the manufacturing method of the microlens array, the lens surface of the first light transmitting layer may have substantially the same width as that of the lens surface of the second light transmitting layer.

In the manufacturing method of the microlens array, the lens surface of the first light transmitting layer may have a smaller width than that of the lens surface of the second light transmitting layer.

A microlens array according to the present invention is manufactured by the above method.

A microlens array according to the present invention includes a first light transmitting layer having a plurality of recessed parts and partitions for delimiting the recessed parts, at least a portion of the inner surface of each recessed part being a lens surface, and second light transmitting layers formed in the respective recessed parts in such a manner that the second light transmitting layers avoid the partitions of the first light transmitting layer, wherein the second light transmitting layers are formed in such a manner that the surfaces of the second light transmitting layers form lens surfaces for the respective recessed parts of the first light transmitting layer.

According to the present invention, since the second light transmitting layers are formed in such a manner that the second light transmitting layers avoid the partitions of the first light transmitting layer, the lens surfaces of the second light transmitting layers are not formed on the partitions. Thus, the optical axes of both lens surfaces have been aligned.

In the microlens array, the lens surfaces formed at the recessed parts of the first light transmitting layer may be convex.

In the microlens array, each of the recessed parts of the first light transmitting layer may have a bottom functioning as a convex lens surface and a wall extending from the bottom.

In the microlens array, each lens surface of the first light transmitting layer may have substantially the same width as that of each lens surface of the second light transmitting layers.

In the microlens array, each lens surface of the first light transmitting layer may have a smaller width than that of each lens surface of the second light transmitting layers.

An optical instrument according to the present invention has the above microlens array.

The optical instrument may further include a light source.

The optical instrument may further include an imager.

DETAILED DESCRIPTION OF THE PREFERRED EMBODIMENTS OF THE INVENTION

Preferable embodiments of the present invention will now be described with reference to the drawings.

First Embodiment

Figure 1:
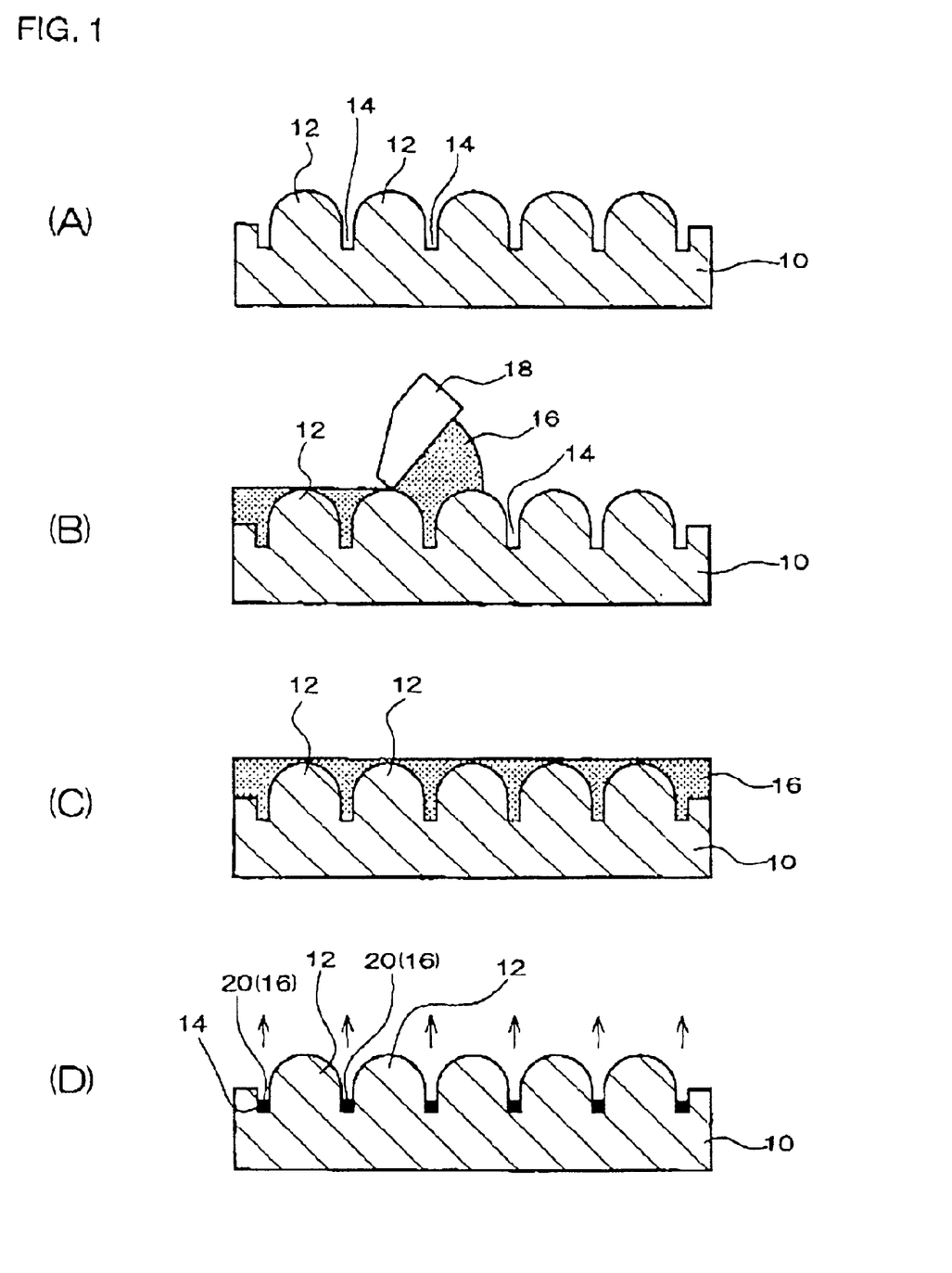
FIGS. 1A to 1D are illustrations showing a method for manufacturing a microlens array according to a first embodiment of the present invention.

FIGS. 1A to 3C are illustrations showing a method for manufacturing a microlens array according to a first embodiment of the present invention. Master FIG. 1 shows a master 10. The master 10 is used for transferring concavities and convexities (lens surfaces) to a first light transmitting layer precursor 22 (see FIG. 2A). The master 10 has a plurality of raised parts 12. At least a part (for example, an end surface) of the surface of each raised part 12 is curved. The curved surface may be spherical, aspherical (ellipsoidal, parabolic, and so on), or cylindrical. The curved portion of the raised part 12 has an inverted shape of a lens surface 30 formed in a first light transmitting layer 26 (see FIG. 2C). Each flat region 14 is formed between raised parts 12 neighboring each other. The flat region 14 is used for forming a partition 32 on the first light transmitting layer 26.

As shown in FIG. 1B, a material 16 having a low affinity for a light transmitting layer precursor (a second light transmitting layer precursor 34) (see FIG. 3A) is provided to the master 10 (at the side where the raised part 12 is formed). Each space between the raised parts 12 is filled with the material 16 so as not to surmount the raised parts 12 by using a squeegee 18.

The material 16 may be, for example, a resin containing a fluoric element, wherein the resin material may be used as the first light transmitting layer precursor 22 described below. By containing a fluoric element, the surface free energy is decreased to lower the affinity for other materials. A fluoric element is introduced into the material 16 by, for example, substituting a fluoric element for one of hydrogen elements in the molecule.

When the material 16 has the property of light shield, a black matrix may be formed in the first light transmitting layer 26. Various materials which have durability and do not transmit light may be used as a light shield material. An exemplary light shield material is a solution in which a black dye or a black pigment and a binder resin are dissolved into a solvent. The solvent is not limited and aqueous or organic solvents may be used. An exemplary solvent is propylene glycol monomethyl ether acetate, propylene glycol monopropyl ether, methoxymethyl propionate, ethoxyethyl propionate, ethyl lactate, ethyl pyruvate, methyl amyl ketone, cyclohexanone, xylene, toluene, or butyl acetate, and the solvent may be used alone or in combination.

Each of the spaces between the raised parts 12 is filled with the material 16 as shown in FIG. 1C, and then the solvent in the material 16 is removed. For example, the solvent is vaporized. As a result, a solid content 20 from the material 16 is left on at least each flat region 14. The solid content 20 is preferably left on regions other than regions (for example, end surfaces) for forming the lens surfaces of the raised parts 12. Thus, the solid content 20 does not remain on the lens surfaces of the first light transmitting layer 26. When the material 16 has a low affinity for the surfaces of the regions for forming the lens surfaces 30 of the raised parts 12, the solid content 20 is easily left on other regions.

First Light Transmitting Layer

As shown in FIG. 2A, the shape of the master 10 is transferred to the light transmitting layer precursor (the first light transmitting layer precursor 22). The first light transmitting layer precursor 22 is preferably liquid or liquefiable. Spaces between the raised parts 12 are easily filled with the first light transmitting layer precursor 22 in a liquid phase. Among liquid materials, the materials that are set by applying energy can be used. Among liquefiable materials, the materials having plasticity can be used.

The first light transmitting layer precursor 22 is preferably a resin and is not limited to specific materials as long as the first light transmitting layer precursor 22 has required characteristics such as light transmission. The resin which has energy-setting capability or plasticity is easily obtained and preferable.

Among energy-setting resins, the resin that is set by applying at least one of light and heat is preferable. When applying light or heat, general exposure systems or heating apparatus such as baking furnaces and heaters may be used; thereby achieving facility cost-saving. Exemplary energy-setting resins include acrylic resins, epoxy resins, melamine resins, and polyimide resins. Acrylic resins are especially preferable since the acrylic resins are set quickly by applying light when various commercial precursors and photosensitive materials (photopolymerization initiators) are used. The exemplary main component of the photosetting acrylic resins includes prepolymers or oligomers, monomers, and photopolymerization initiators. Exemplary prepolymers or oligomers include acrylates such as epoxy acrylates, urethane acrylates, polyester acrylates, polyether acrylates, and spiroacetal acrylates, methacrylates such as epoxy methacrylates, urethane methacrylates, polyester methacrylates, and polyether methacrylates.

Exemplary monomers include monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexaacrylate.

Exemplary photopolymerization initiators include radical-generating compounds such as acetophenones such as 2,2-dimethoxy-2phenylacetophenone; butylphenones such as α-hydroxyisobutylphenone and p-iospropyl-α-hydroxyisobutylphenone; halogenated acetophenones such as p-tert-butyldichloroacetophenone, p-tert-butyltrichloroacetophenone, and α,α-dichloro-4-phenoxyacetophenone; benzophenones such as benzophenone and N,N-tetraethyl-4,4-diaminobenzophenone; benzils such as benzil and benzil dimethylketal; benzoins such as benzoin and benzoin alkyl ether; oximes such as 1-phenyl-1,2-propanedione-2-(o-ethoxycarbonyl)oxime; xanthones such as 2-methylthioxanthone and 2-chlorothioxanthone; Michler's ketone; and benzil methylketal.

If necessary, compounds such as amines may be added to prevent setting-inhibition caused by oxygen, and solvents may be added to assist in applying. The solvents are not limited, and the exemplary solvents include propylene glycol monomethyl ether acetate, methoxymethyl propionate, ethoxyethyl propionate, ethyl lactate, ethyl pyruvate, methyl amyl ketone, and so on. The above compounds preferably have excellent releasability when silicon or quartz is used, wherein silicon and quartz are suitable for the material of the master 10 because silicon and quartz are capable of being etched with high accuracy.

Exemplary plastic resins include thermoplastic resins such as polycarbonate resins, poly(methyl methacrylate) resin, and amorphous polyolefin resins. Such a resin is plasticized or liquefied by heating up to a temperature exceeding the softening point, and then provided to the master 10 as shown in FIG. 2A. A step of spreading the first light transmitting layer precursor 22 is performed. For example, the first light transmitting layer precursor 22 is sandwiched between the master 10 and the substrate 24 to adhere to the master 10; thereby spreading the first light transmitting layer precursor 22 over a predetermined region.

The substrate 24 may have at least a function required for spreading the first light transmitting layer precursor 22. One surface of the substrate 24 may be flat, and the flat surface may be pressed to adhere to the first light transmitting layer precursor 22 in such a case. If the substrate 24 is left adhered to the first light transmitting layer precursor 22, the substrate 24 is not limited to a specific material as long as the substrate 24 has characteristics such as mechanical strength and optical properties, for example, light transmission which is necessary for a microlens array. The exemplary material of the substrate 24 may be a quartz, glass, or plastic substrate or film, wherein the plastic includes polycarbonate, polyarylate, polyethersulfone, polyethylene terephthalate, poly(methyl methacrylate), and amorphous polyolefins. If the substrate 24 is removed in a subsequent step, the substrate 24 may not have light transmission.

When sandwiching the first light transmitting layer precursor 22 between the master 10 and the substrate 24 to adhere to the master 10, at least one of the master 10 or the substrate 24 may push the first light transmitting layer precursor 22, if necessary. Spreading time of the first light transmitting layer precursor 22 is reduced by pushing; hence, the operation is improved, and the spaces between the raised parts 12 provided to the master 10 are surely filled with the first light transmitting layer precursor 22.

In the embodiment shown in FIG. 2A, the first light transmitting layer precursor 22 is placed on the master 10 and then is sandwiched between the substrate 24 and the master 10. Instead of this method, the following procedure may be possible: the first light transmitting layer precursor 22 is placed on the substrate 24 and the master 10 is placed thereon, that is, the first light transmitting layer precursor 22 is provided to the master 10, and then the first light transmitting layer precursor 22 is spread with the substrate 24 and the master 10. Also, the first light transmitting layer precursor 22 may be provided to both the master 10 and the substrate 24 in advance.

After the above steps, as shown in FIG. 2B, a layer composed of the first light transmitting layer precursor 22 is formed between the master 10 and the substrate 24. Then, solidification is performed in accordance with the property of the first light transmitting layer precursor 22. For example, when a photosetting resin is used, the resin is irradiated with light under required conditions.

When the first light transmitting layer 26 includes a photosetting material, at least one of the substrate 24 and the master 10 is necessary to have light transmission. When a resin plasticized by heating up to a temperature exceeding the softening point is used as the first light transmitting layer precursor 22, cooling is performed for solidification.

As shown in FIG. 2C, the layer composed of the first light transmitting layer precursor 22 is released from the master 10. Also, the material 16 (see FIG. 1D) is released from the master 10 together with the layer composed of the first light transmitting layer precursor 22. Then, the first light transmitting layer 26 is completed. The solid content 20 will now be described as a portion of the first light transmitting layer 26.

The releasability between the first light transmitting layer 26 (or the first light transmitting layer precursor 22) and the master 10 (especially, the raised parts 12 thereof) is preferably high (for example, the affinity is low or the adherence is low). The releasability between the first light transmitting layer 26 (or the first light transmitting layer precursor 22) and the material 16 (or the solid content 20 thereof) is preferably low (for example, the affinity or the adherence is high). The releasability between the master 10 (especially, the flat region 14) and the material 16 (or the solid content 20 thereof) is preferably high (for example, the affinity is low or the adherence is low).

Figure 2:
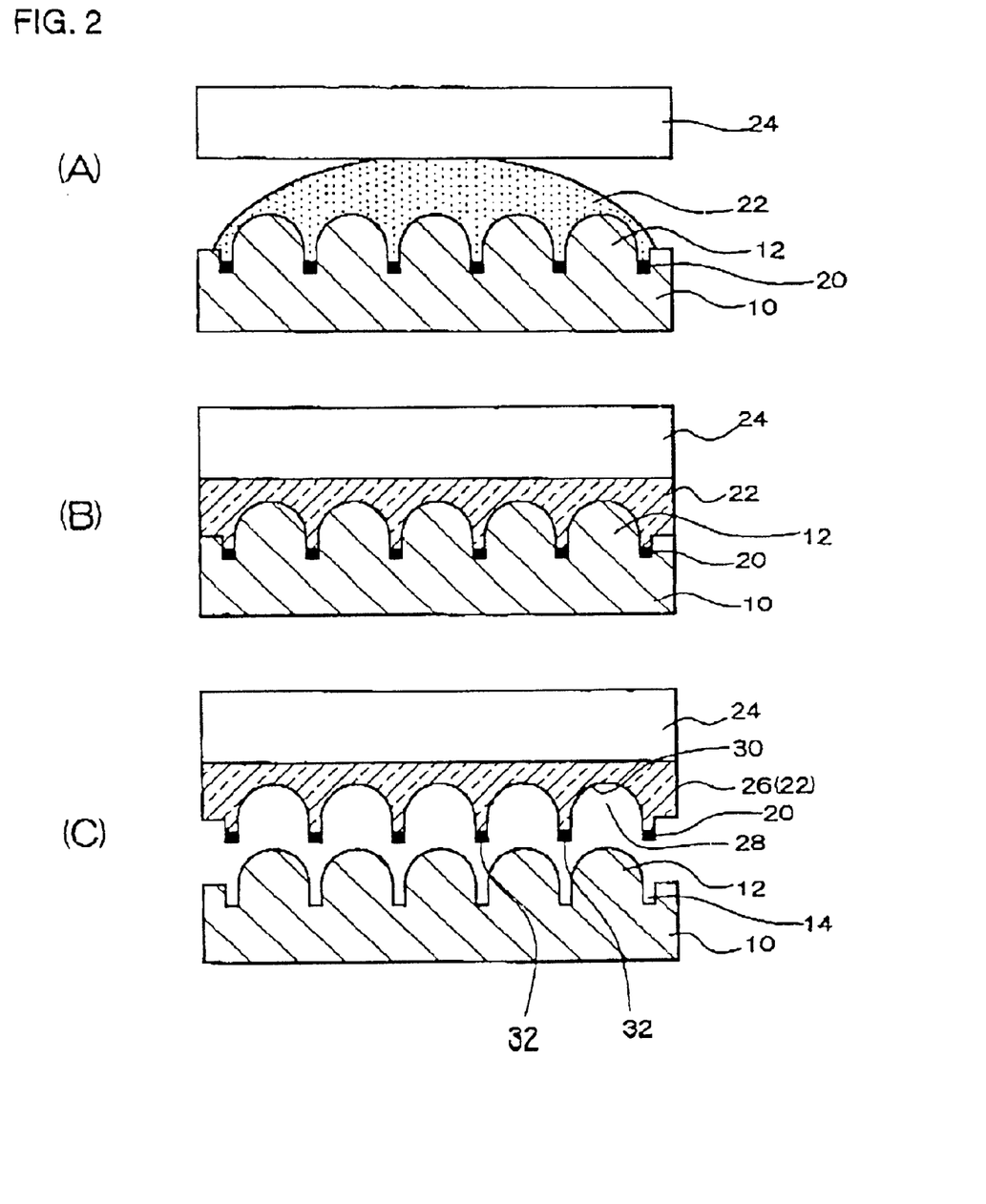
FIGS. 2A to 2C are illustrations showing the manufacturing method of the microlens array according to the first embodiment of the present invention.

The first light transmitting layer precursor 26 is formed in accordance with the above procedure in this embodiment, and the forming method of the first light transmitting layer precursor 26 is not limited to the procedure in the present invention. The first light transmitting layer 26 has a plurality of recessed parts 28. Each of the recessed parts 28 forms an inverted shape of each of the raised parts 12 described above. At least a portion (for example, the bottom) of the recessed part 28 is a lens surface 30. The lens surfaces 30 shown in FIG. 2 <C> are recessed (concave lens surfaces). A lens composed of each lens surface 30 may be spherical, aspherical (ellipsoidal, parabolic, and so on), or cylindrical.

A plurality of the recessed parts 28 is partitioned by the partitions 32. Each partition 32 is composed of the solid content 20 of the material 16 described above. As a result, the partitions 32 have a low affinity for a light transmitting layer precursor (the second light transmitting layer precursor 34). When viewed in plan, each partition 32 may be circular or polygonal (for example, quadrangular or octagonal). The partitions 32 may form a black matrix.

Second Light Transmitting Layer

Figure 3:
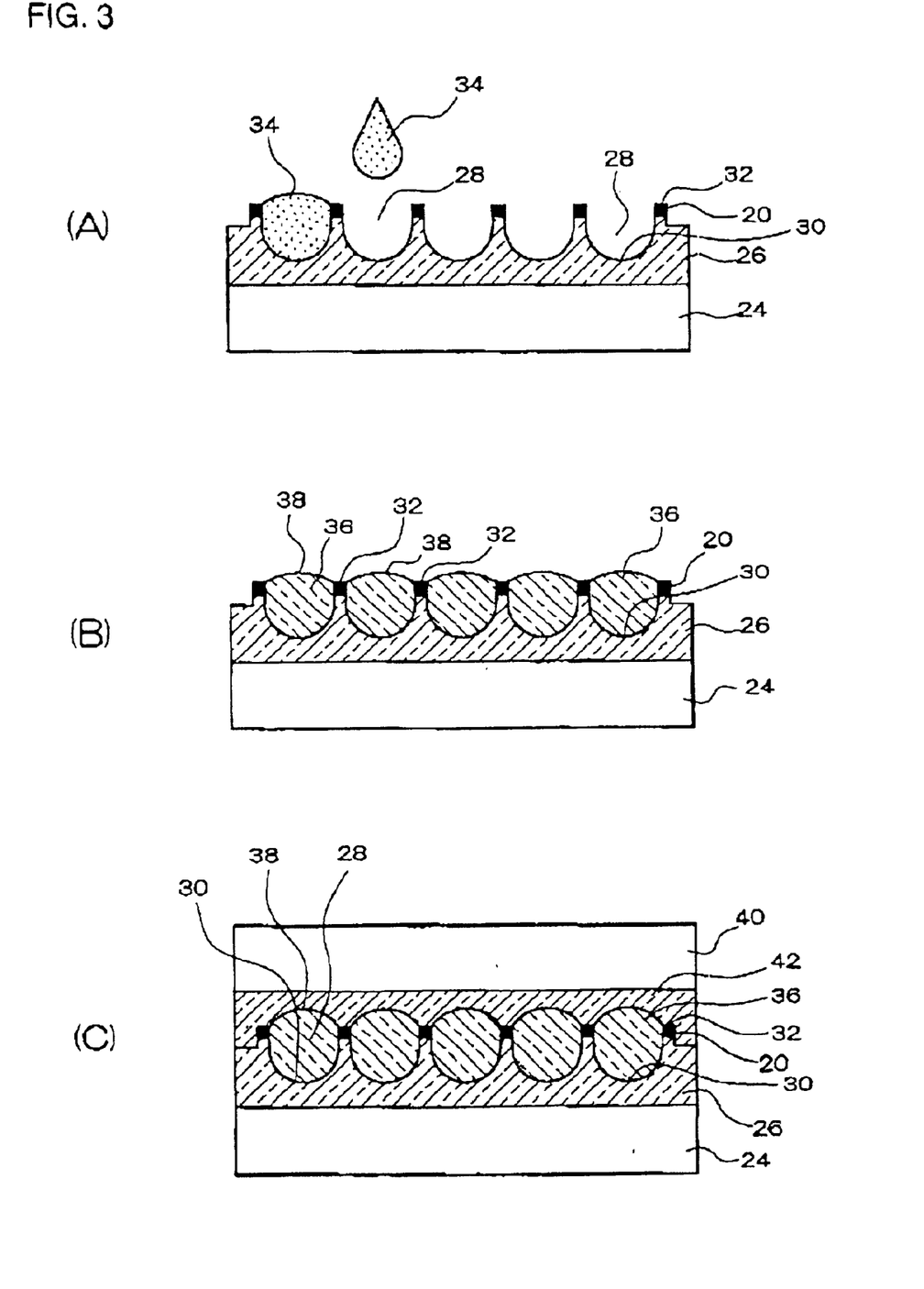
FIGS. 3A to 3C are illustrations showing the manufacturing method of the microlens array according to the first embodiment of the present invention.

As shown in FIG. 3A, light transmitting layer precursors (the second light transmitting layer precursors) 34 are provided on the first light transmitting layer 26. In more detail, each of the second light transmitting layer precursors 34 is provided in each of the recessed parts 28. That is, each second light transmitting layer precursor 34 is provided in such a manner that the second light transmitting layer precursors 34 avoid the partitions 32. A material used for the second light transmitting layer precursor 34 may be selected from the above materials which may be used for the first light transmitting layer precursor 22.

In this embodiment, the partitions 32 have a low affinity for the second light transmitting layer precursor 34. Thus, if the second light transmitting layer precursor 34 touches the partitions 32, the second light transmitting layer precursor 34 is repelled by the partitions 32 and remains in each recessed part 28. The second light transmitting layer precursor 34 may be provided in each recessed part 28 by ink jet method. In this case, the second light transmitting layer precursor 34 is provided so as to overflow the partitions 32. The second light transmitting layer precursor 34 is repelled by the partitions 32, and remains in the recessed part 28 in such a manner that the second light transmitting layer precursor 34 rises from the recessed part 28. That is, surface tension causes the surface of the second light transmitting layer precursor 34 to form a curved surface (a raised surface) for each recessed part 28.

As a result, as shown in FIG. 3B, second light transmitting layers 36 are formed on the first light transmitting layer 26. Each of the second light transmitting layers 36 is formed in each recessed part 28 in such a manner that each second light transmitting layer 36 avoid the partitions 32 of the first light transmitting layer 26. The surface of each second light transmitting layer 36 forms a lens surface 38 for each recessed part 28. According to this embodiment, the lens surface 38 is not formed on the partition 32. Accordingly, the optical axis of the lens surface 30 of the first light transmitting layer 26 is easily aligned with the optical axis of the lens surface 38 of each second light transmitting layer 36.

If necessary, as shown in FIG. 3C, a substrate 40 (a reinforcer, a protector, or a cover) may be provided on the second light transmitting layers 36. The substrate 40 may be bonded to the second light transmitting layers 36 with an adhesive agent 42. The adhesive agent 42 may be a material which may be used for the first light transmitting layer 26.

The substrate 40 may be composed of a material which is used for the substrate 24. If the second light transmitting layers 36 have enough strength such as process resistance, the substrate 40 may not be provided. As a result of the above procedure, the microlens array is completed.

Microlens Array

As shown in FIG. 3C, the microlens array according to this embodiment has the first light transmitting layer 26. The first light transmitting layer 26 may allow light transmission, and may be colored or transparent. It is not essential that the first light transmitting layer 26 have a transmittance of 100%, but the first light transmitting layer 26 can not have a transmittance of 0%. The first light transmitting layer 26 is composed of a resin in this embodiment, and may be composed of glass in a modification. The first light transmitting layer 26 has a plurality of recessed parts 28 and the partitions 32 for delimiting the recessed parts 28. At least a portion of the inner surface of the recessed part 28 forms the lens surface 30. The lens surface 30 is concave. The microlens array has the second light transmitting layers 36. Each of the second light transmitting layers 36 is formed in each of the recessed parts 28 in such a manner that each second light transmitting layer 36 avoids the partitions 32 of the first light transmitting layer 26. The surface of each second light transmitting layer 36 forms the lens surface 38 for each recessed part 28.

The lens surfaces 30 and 38 are interfaces between media neighboring each other. Since the lens surfaces 30 and 38, which are the interfaces, form raised surfaces protruding in the opposite direction to each other, a lens composed thereof is biconvex. The lens surfaces 30 and 38 may have a substantially equal width.

When manufactured by the method described above, the microlens array has a configuration formed thereby. The present invention is not limited to the above embodiment, and variations and modifications are possible. Other embodiments will now be described.

Second Embodiment

Figure 4:
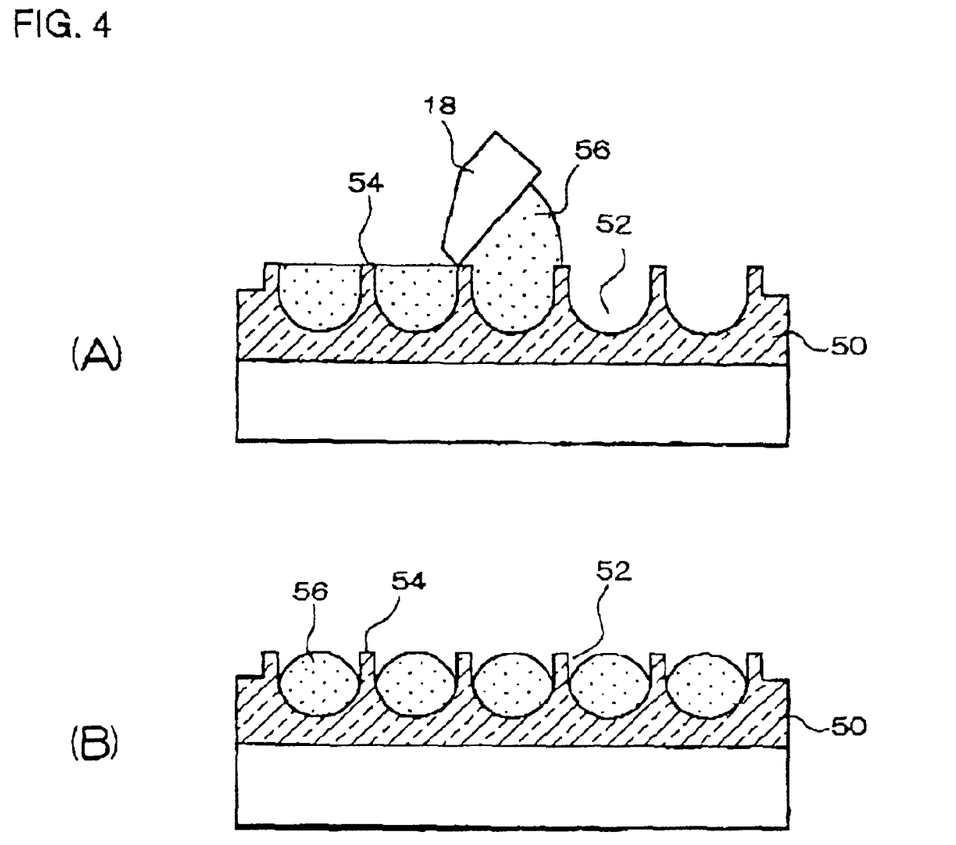
FIGS. 4A to 4B are illustrations showing a method for manufacturing a microlens array according to a second embodiment of the present invention.

FIGS. 4A and 4B illustrate a manufacturing method of the microlens array according to a second embodiment of the present invention. Steps according to this embodiment may be performed instead of the steps of the first embodiment described with reference to FIGS. 3A and 3B.

In a first light transmitting layer 50 used in this embodiment, the inner surface of each of recessed parts 52 is preferably composed of a material having a low affinity for second light transmitting layer precursors 56. In this case, since the recessed parts 52 repel the second light transmitting layer precursors 56, the surface of each of the second light transmitting layer precursors 56 forms a lens surface for each recessed part 52.

In detail, as shown in FIG. 4A, each second light transmitting layer precursor 56, in a gel state, may be provided in the recessed part 52 by using a squeegee 18. In this case, the second light transmitting layer precursor 56 is provided so as not to surmount partitions 54. Then, the second light transmitting layer precursor 56 may be melted by applying energy (heat by reflowing). As shown in FIG. 4B, the melted second light transmitting layer precursor 56 has a lens surface generated by the surface tension. The second light transmitting layer precursor 56 is formed into the second light transmitting layer by curing.

In this embodiment, the effects described in the first embodiment are achieved. Also, the operations and the procedures described in the first embodiment may be applied to this embodiment.

Third Embodiment

Figure 5:
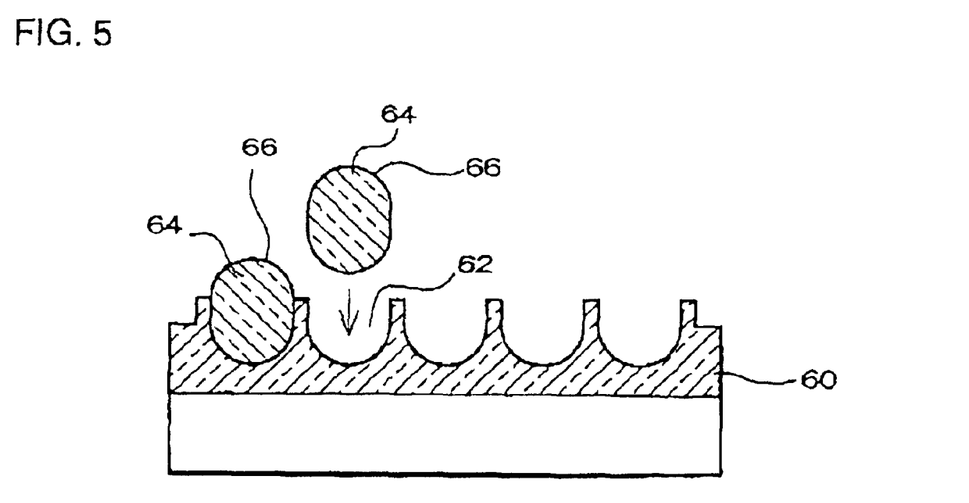
FIG. 5 is an illustration showing a method for manufacturing a microlens array according to a third embodiment of the present invention.

FIG. 5 illustrates a manufacturing method of the microlens array according to the third embodiment of the present invention. Steps according to this embodiment may be performed instead of the steps of the first embodiment described with reference to FIGS. 3A and 3B.

In this embodiment, each of lens elements 64 is placed in each of a plurality of recessed parts 62 of a first light transmitting layer 60. Each second light transmitting layer is composed of each lens element 64 provided in each recessed part 62. Each lens element 64 included in the second light transmitting layer has a lens surface 66. The lens element 64 is provided in each recessed part 62 in such a manner that the lens surface 66 is located in a position opposite to the recessed part 62. That is, the lens surface 66 is provided so as to protrude from the recessed part 62. The part of the lens element 64 located in the recessed part 62 may be formed so as to fit the recessed part 62, or may have flexibility and a larger size than that of the recessed part 62.

In this embodiment, the effects described in the first embodiment are achieved. Also, the operations and the procedures described in the first embodiment may be applied to this embodiment.

Fourth Embodiment

Figure 6:
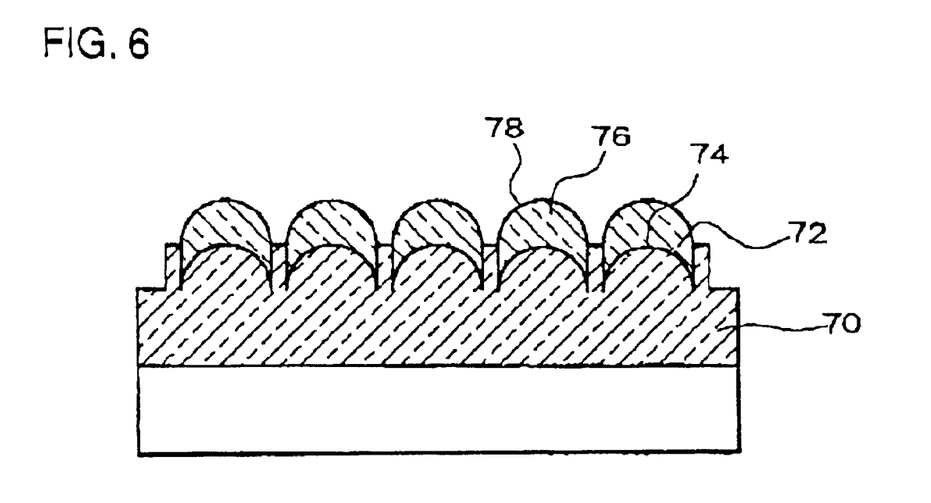
FIG. 6 is an illustration showing a microlens array according to a fourth embodiment of the present invention.

FIG. 6 illustrates a manufacturing method of the microlens array according to the fourth embodiment of the present invention. In this embodiment, the shape of each of recessed parts 72 provided on a first light transmitting layer 70 is different from that of the recessed part 28 (see FIG. 3C) described in the first embodiment. Each recessed part 72 of this embodiment has a bottom functioning as a convex lens surface 74 and a wall rising from the bottom. The convex lens surface 74 may be spherical, aspherical (ellipsoidal, parabolic, and so on), or cylindrical.

According to this embodiment, the convex lens surface 74 of the first light transmitting layer 70 and a lens surface 78 included in each of second light transmitting layer 76 form a concave-convex lens (the one surface is concave and the other surface is convex). That is, the convex lens surface 74 and the lens surface 78 are interfaces between media neighboring each other and are disposed in such a manner that the lens surfaces thereof protrude in the same direction.

In this embodiment, the effects described in the first embodiment are achieved. Also, the operations and the procedures described in the first embodiment may be applied to this embodiment.

Fifth Embodiment

Figure 7:
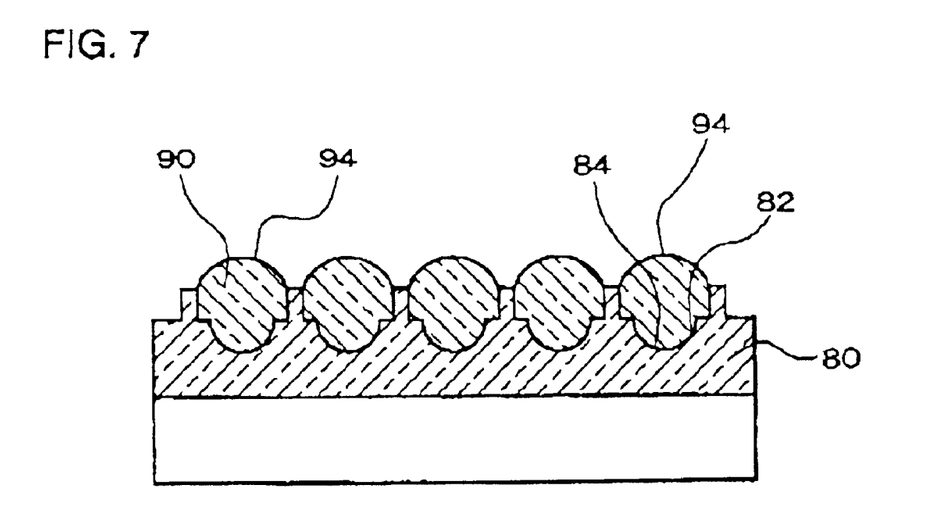
FIG. 7 is an illustration showing a microlens array according to a fifth embodiment of the present invention.

FIG. 7 illustrates a microlens array according to the fifth embodiment of the present invention. In this embodiment, the shape of each of recessed parts 82 provided on a first light transmitting layer 80 is different from that of the recessed part 28 (see FIG. 3C) described in the first embodiment. A lens surface 84 included in each of recessed parts 82 may have a smaller width than that of a lens surface 94 included in each of second light transmitting layers 90. The lens surface 84 may be spherical, aspherical (ellipsoidal, parabolic, and so on), or cylindrical.

In this embodiment, the effects described in the first embodiment are achieved. Also, the operations and the procedures described in the first embodiment may be applied to this embodiment.

Sixth Embodiment

Figure 8:
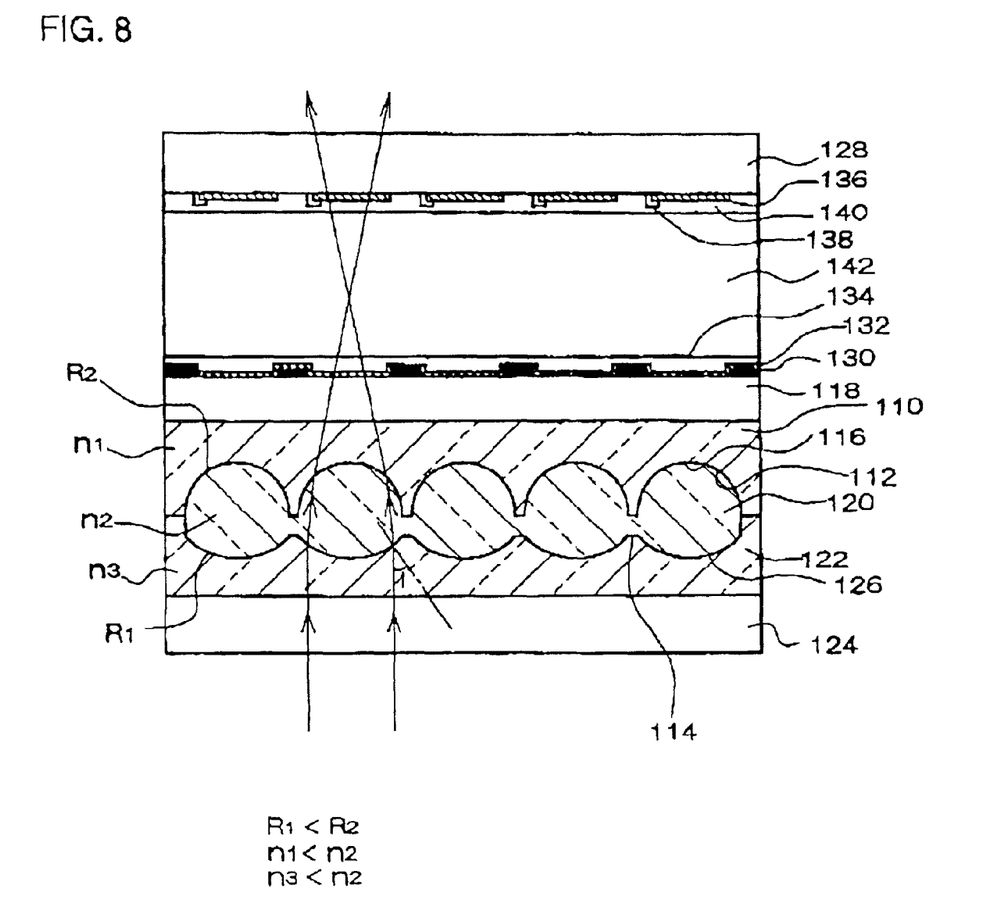
FIG. 8 is an illustration showing an optical instrument according to a sixth embodiment of the present invention.

FIG. 8 illustrates an optical instrument according to the sixth embodiment of the present invention. The optical instrument is a liquid crystal panel having a microlens array. The microlens array has a first light transmitting layer 110 and a second light transmitting layer 120. The first light transmitting layer 110 has a plurality of recessed parts 112 and partitions 114 for delimiting the recessed parts 112. At least a portion of each of the recessed parts 112 is a lens surface 116. A substrate 118 is provided on the first light transmitting layer 110 on the opposite side of the recessed parts 112. The substrate 118 is a portion of the liquid crystal panel. The second light transmitting layer 120 has another lens surface 126 for each recessed part 112. A third light transmitting layer 122 (in this case, an adhering layer) is provided on the second light transmitting layer 120, and another substrate 124 is provided on the third light transmitting layer 122.

The lens surfaces 116 may be defined as an interface between the first light transmitting layer 110 and the second light transmitting layer 120, and also the lens surfaces 126 may be defined as an interface between the first light transmitting layer 110 and the second light transmitting layer 120. Light enters one of the lens surfaces 116 and 126 and exits from the other. The lens surfaces 116 and 126 are disposed in the laminated or layered manner. When the microlens array is included in an optical instrument displaying images with a plurality of pixels, the lens surfaces 116 and 126 are arranged in such a manner that each of the lens surfaces 116 and 126 correspond to each pixel (each sub-pixel, in case of color displaying).

A normal passing through the center of curvature of the lens surface 116 and another normal passing through the center of curvature of the lens surface 126 preferably coincide. The lens surface 126 has a gentler curved surface than that of another lens surface 116. For example, when the lens surfaces 116 and 126 are spherical lenses, a radius R1 of the curvature of the lens surface 126 and a radius R2 of the curvature of the lens surface 116 have a relationship in which R2<R1.

According to this embodiment, since the lens surface 126 which light enters has a gentle curved surface, an incident angle i (an angle which the normal of the lens surface 126 forms with light) of light is small when light enters the lens surface 126. Thus, the amount of reflected light decreases and the amount of incident light increases; hence, the degree of brightness increases. When light enters an interface between two materials, light is partly reflected in general. It is known that the amount of the reflected light is large in proportion to a difference in refractive index between the two materials and an incident angle of light.

In this embodiment, the second light transmitting layer 120 is sandwiched between the first and third light transmitting layers 110 and 122, respectively. The first, second, and third light transmitting layer 110, 120, and 122, respectively, have refractive indexes n1, n2, and n3, respectively, wherein n1<n2 and n3<n2. Under the above relationship, when light enters the second light transmitting layer 120 through the third light transmitting layer 122, the light enters the convex surface of the lens surface 126 and is refracted in the direction approaching the normal of the lens surface 126 (in the direction approaching the optical axis). Then, the light passing through the first light transmitting layer 110 through the second light transmitting layer 120 enters the concave surface of the lens surface 116 and is refracted in the direction moving away from the normal of the lens surface 116 (in the direction approaching the optical axis).

The above microlens array is provided in the liquid crystal panel. The liquid crystal panel has a substrate 118 and another substrate (TFT substrate) 128. A black matrix 130, common electrodes 132, and an oriented layer 134 are provided above the substrate 118. An individual electrode 136 and a thin-film transistor 138 are provided on the bottom of the substrate 128, and another oriented layer 140 is provided thereon. The space between the oriented layers 134 and 140 is filled with a liquid crystal 142 driven by a voltage controlled by the thin-film transistor 138.

In the microlens array, the lens surface 126 having a gently curved surface faces in the direction of incident light;

hence, a large amount of light achieved by reducing reflection enters the microlens array, and exits while converging. As a result, a large amount of converging light enters the liquid crystal panel to display well-lighted images.

Seventh Embodiment

Figure 9:
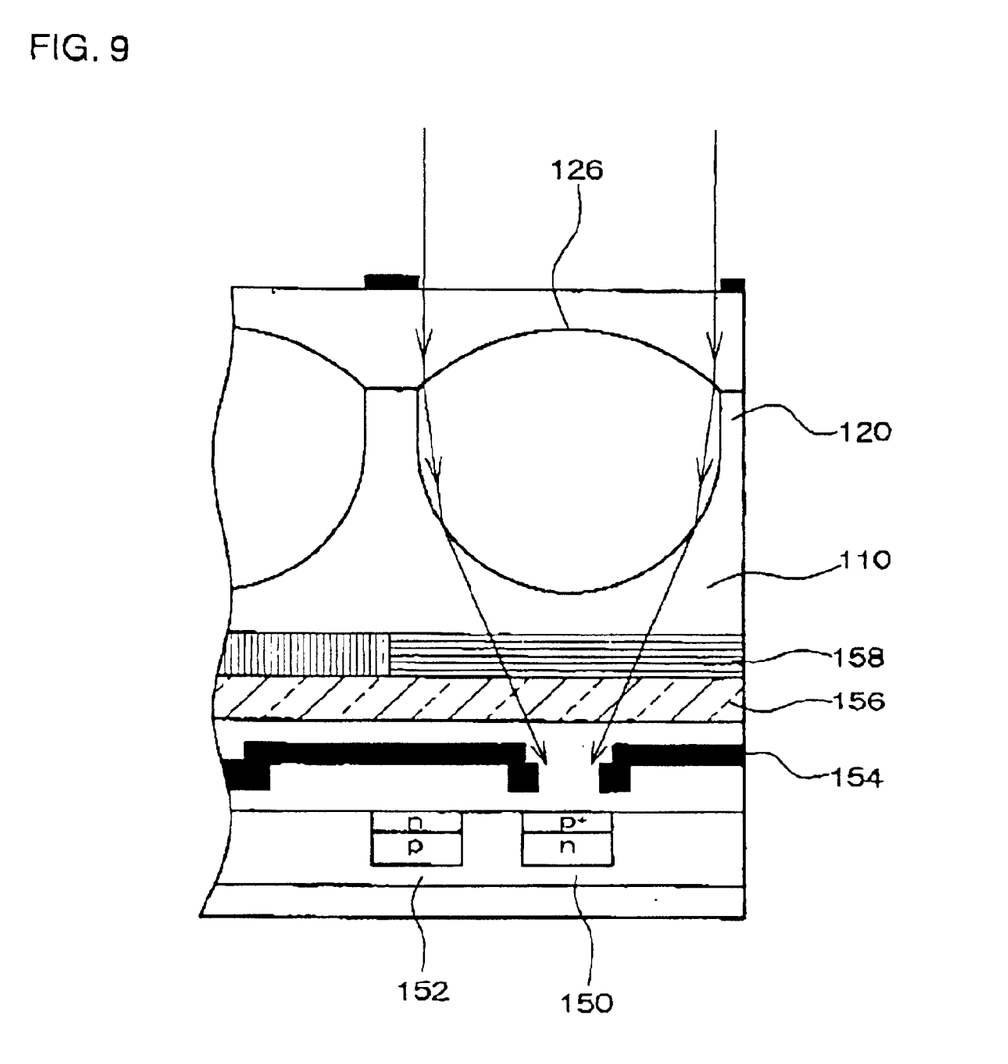
FIG. 9 is an illustration showing an optical instrument according to a seventh embodiment of the present invention.

FIG. 9 illustrates an image pickup unit as an exemplary optical instrument according to the seventh embodiment of the present invention. The image pickup unit has image sensors. For example, a photoreceptor 150 (for example, a photodiode) corresponding to each of a plurality of pixels is provided to each two-dimensional image sensor. Each imager which is a CCD (charge coupled device) has a transmitter 152 to transmit, at a high speed, charge received from the photoreceptor 150 of each pixel. A light shield layer 154 may be formed to prevent light from entering the photoreceptor 150 from pixels which do not correspond thereto. Color imagers have a color filter 158.

The imager is provided with a microlens array according to the present invention. The microlens array has the first and second light transmitting layers 110 and 120, respectively. That is described in the sixth embodiment in detail. Light enters the lens surface 126, which is gently curved, from the outside. According to this embodiment, since a large amount of light enters the photoreceptor 150 while converging, clear images may be produced. Other effects are also described in the sixth embodiment in detail.

Eighth Embodiment

Figure 10:
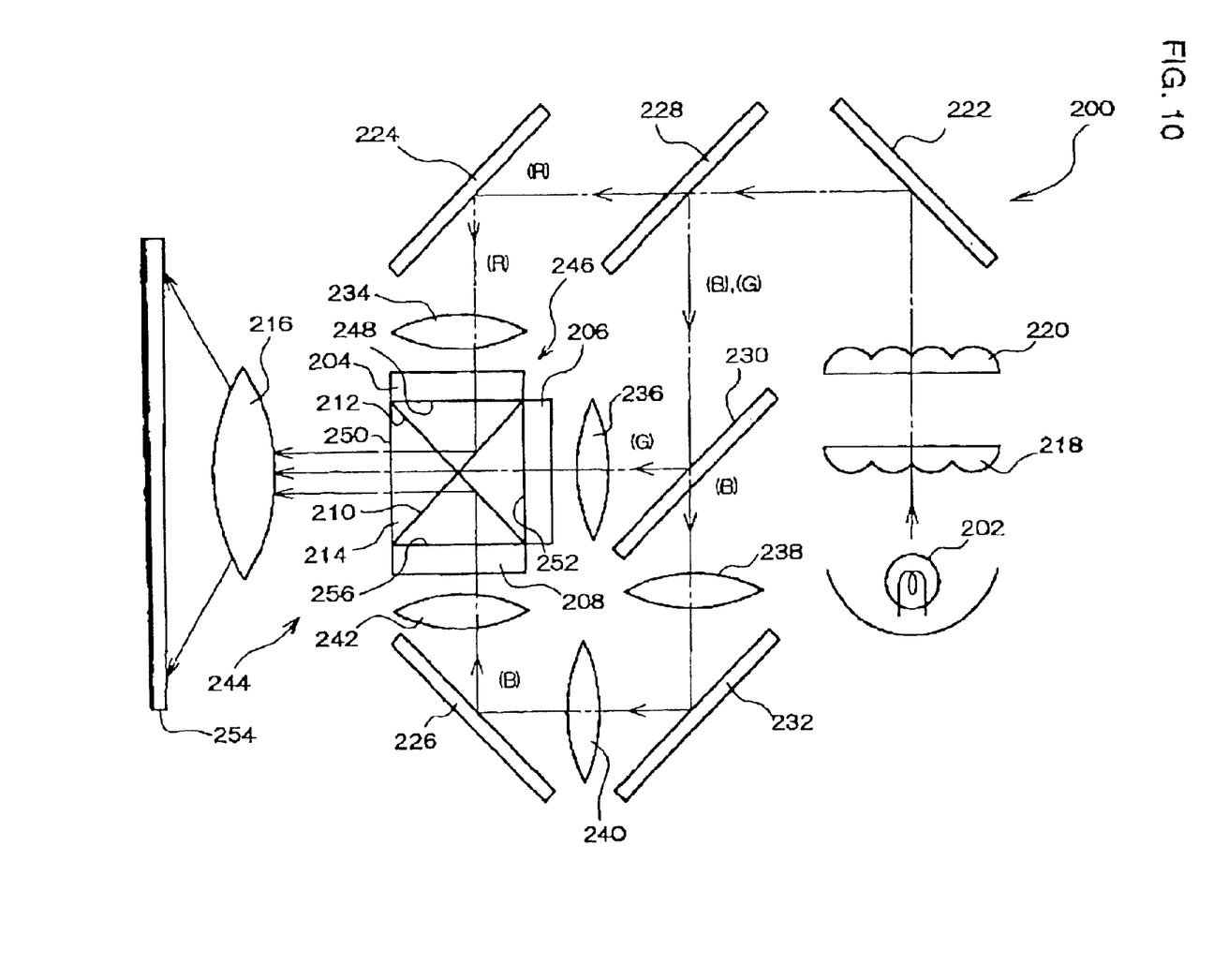
FIG. 10 is an illustration showing an optical instrument according to an eighth embodiment of the present invention.

FIG. 10 illustrates an optical instrument according to the eighth embodiment of the present invention. The optical instrument is a projection display system (a liquid crystal projector).

The optical instrument 200 has a plurality of liquid crystal panels 204, 206, and 208. The liquid crystal panel 204 functions as a liquid crystal light bulb (a liquid crystal light shutter array) for red light, the liquid crystal panel 206 functions as another liquid crystal light bulb (a liquid crystal light shutter array) for green light, and the liquid crystal panel 208 functions as yet another liquid crystal light bulb (a liquid crystal light shutter array) for blue light.

A microlens array, not shown, is provided to each of the liquid crystal panels 204, 206, and 208. The microlens array is described in any one of the above embodiments.

The optical instrument 200 has a lighting optical portion provided with a plurality of integrator lenses, a color-separating optical portion (a light-guiding optical portion) provided with at least a plurality of dichroic mirrors, a dichroic prism 214 (a color-combining optical portion) in which a dichroic mirror surface 210 reflecting only red light and another dichroic mirror surface 212 reflecting only blue light are formed, and a projection lens 216 (projecting optical portion).

The lighting optical portion has integrator lenses 218 and 220. The color-separating optical portion has mirrors 222, 224, and 226, a dichroic mirror 228 reflecting blue light and green light, that is, transmitting only red light, another dichroic mirror 230 reflecting only green light, yet another dichroic mirror 232 reflecting only blue light (or a mirror reflecting blue light), and condenser lenses 234, 236, 238, 240, and 242.

A first polarizing plate (not shown) is bonded to the liquid crystal panel 204 on the light-entering side (the side in which a microlens substrate is positioned, that is, the side opposite to the dichroic prism 214). A second polarizing plate (not shown) is bonded to the liquid crystal panel 204 on the light-exiting side (the side to which a microlens substrate is faced, that is, the side in which the dichroic prism 214 is positioned). The liquid crystal panels 206 and 208 have the same structure as that of the liquid crystal panel 204. Each of the liquid crystal panels 204, 206, and 208 are connected to a driving circuit, not shown.

In the optical instrument 200, an optical block 244 is composed of the dichroic prism 214 and projection lens 216. A display unit 246 is composed of the optical block 244 and the liquid crystal panels 204, 206, and 208 fixed to the dichroic prism 214.

The operation of the optical instrument 200 will now be described. White light (white luminous flux) emitted from a light source 202 passes through the integrator lenses 218, 220. The light intensity (luminance distribution) of the white light is made uniform by the integrator lenses 218 and 220. The white light passing through the integrator lenses 218, 220 are reflected by the mirror 222. Blue light (B) and green light (G) of the reflected light are reflected by the dichroic mirror 228, and red light of the reflected light passes through the dichroic mirror 228. The red light passing through the dichroic mirror 228 is reflected by the mirror 224, and the reflected red light is focused by the condenser lens 234 to enter the liquid crystal panel 204 for red light. In the light reflected by the dichroic mirror 228, the green light is reflected by the dichroic mirror 230, and the blue light passes through the dichroic mirror 230. The green light reflected by the dichroic mirror 230 is focused by the condenser lens 236 to enter the liquid crystal panel 206 for green light. The blue light passing through the dichroic mirror 230 is reflected by the dichroic mirror (or a mirror) 232 and the reflected blue light is reflected by the dichroic mirror 226. The blue light is focused by the condenser lenses 238, 240, and 242 to enter the liquid crystal panel 208.

As described above, the white light emitted from the light source is separated into three primary color lights in the color-separating optical portion and each colored light is guided to enter the corresponding liquid crystal panel. In this operation, each pixel (a thin-film transistor and pixel electrodes connected thereto) included in the liquid crystal panel 204 is controlled (turned on and off), that is, is modulated, by a driving circuit (a driving means) functioning in response to image signals for red light. In the same manner, green light and blue light enter the liquid crystal panels 206 and 208, respectively, and are modulated by the liquid crystal panels corresponding thereto; thereby forming an image for green and an image for blue. In this step, each pixel included in the liquid crystal panel 206 is controlled by a driving circuit functioning in response to image signals for green light, and each pixel included in the liquid crystal panel 208 is controlled by another driving circuit functioning in response to image signals for blue light. Thus, the red light, the green light, and the blue light are modulated by the liquid crystal panels 204, 206, and 208, respectively, to form images for red, green, and blue.

The red image formed by the liquid crystal panel 204, that is, the red light passing through the liquid crystal panel 204 enters the dichroic prism 214 through a surface 248, is reflected by the dichroic mirror surface 210, passes through the dichroic mirror surface 212, and exits from an exiting surface 250. The green image formed by the liquid crystal panel 206, that is, the green light passing through the liquid crystal panel 206 enters the dichroic prism 214 through a surface 252, passes through the dichroic mirror surfaces 210 and 212, and exits from the exiting surface 250. The blue image formed by the liquid crystal panel 208, that is, the blue light passing through the liquid crystal panel 208 enters the dichroic prism 214 through a surface 256, is reflected by the dichroic mirror surface 212, passes through the dichroic mirror surface 210, and exits from the exiting surface 250.

As described above, the color lights passing through the liquid crystal panels 204, 206, and 208, that is, the images formed by the liquid crystal panels 204, 206, and 208 are combined by the dichroic prism 214 to form a color image. The color image is projected (projected in an enlarged manner) onto a screen 254 located in a proper position through the projection lens 216.

What is claimed is:

1. A method for manufacturing a microlens array comprising the steps of:

provide a first light transmitting layer, forming second light transmitting layers on the first light transmitting layer, wherein the first light transmitting layer has a plurality of recessed parts and partitions for delimiting the recessed parts, at least a portion of an inner surface of each recessed part being a lens surface, the second light transmitting layers are formed in the respective recessed parts such that the second light transmitting layers avoid the partitions of the first light transmitting layer, and the second light transmitting layers are formed such that surfaces of the second light transmitting layers form lens surfaces for the respective recessed parts of the first light transmitting layer, wherein the first light transmitting layer is provided with light transmitting layer precursors thereon, and then the second light transmitting layers are formed, and wherein the surfaces of the partitions of the first light transmitting layer comprise a material having a low affinity for the light transmitting layer precursors, and each surface of the light transmitting layer precursors forms a raised surface for each recessed part by repulsion of the light transmitting layer precursors by the partitions.

2. A method for manufacturing a microlens array according to claim 1, wherein each of the light transmitting layer precursors is provided in each of the recessed parts by an ink jet process in such a manner that each light transmitting layer precursor protrudes from each recessed part.

3. A method for manufacturing a microlens array comprising the steps of:

providing a first light transmitting layer, forming second light transmitting layers on the first light transmitting layer, wherein the first light transmitting layer has a plurality of recessed parts and partitions for delimiting the recessed parts, at least a portion of an inner surface of each recessed part being a lens surface, the second light transmitting layers are formed in the respective recessed parts such that the second light transmitting layers avoid the partitions of the first light transmitting layer, and the second light transmitting layers are formed such that surfaces of the second light transmitting layers form lens surfaces for the respective recessed parts of the first light transmitting layer, wherein the first light transmitting layer is provided with light transmitting layer precursors thereon, and then the second light transmitting layers are formed, and wherein the inner surface of each recessed part of the first light transmitting layer comprises a material having a low affinity for the light transmitting layer precursors, and each surface of the light transmitting layer precursors forms a raised surface for each recessed part by repulsion of the light transmitting layer precursors by the recessed parts.

4. A method for manufacturing a microlens array according to claim 3, wherein each of the light transmitting layer precursors is provided in a gel state in each of the recessed parts and then is liquefied by applying energy.

5. A method for manufacturing a microlens array according to claim 4, wherein each of the light transmitting layer precursors is provided in a gel state in each of the recessed parts with a squeegee such that each light transmitting layer precursor does not surmount each partition.

6. A method for manufacturing a microlens array comprising the steps of:

providing a first light transmitting layer, forming a plurality of laterally spaced apart second light transmitting layers on the first light transmitting layer, wherein the first light transmitting layer has a plurality of recessed parts and partitions for delimiting the recessed parts, at least a portion of an inner surface of each recessed part being a lens surface, each of the plurality of second light transmitting layers is formed in the respective recessed parts such that the second light transmitting layers avoid the partitions of the first light transmitting layer, and the second light transmitting layers are formed such that surfaces of the second light transmitting layers opposite the portions of the inner surfaces of the recessed parts form lens surfaces for the respective recessed parts of the first light transmitting layer, wherein each recessed part of the first light transmitting layer has a bottom functioning as a convex lens surface and a wall extending from the bottom.

7. A method for manufacturing a microlens array comprising the steps of:

providing a first light transmitting layer, forming second light transmitting layers on the first light transmitting layer, wherein the first light transmitting layer has a plurality of recessed parts and partitions for delimiting the recessed parts, at least a portion of an inner surface of each recessed part being a lens surface, the second light transmitting layers are formed in the respective recessed parts such that the second light transmitting layers avoid the partitions of the first light transmitting layer, and the second light transmitting layers are formed such that surfaces of the second light transmitting layers form lens surfaces for the respective recessed parts of the first light transmitting layer, wherein the lens surface of the first light transmitting layer has a smaller width than a width of the lens surface of the second light transmitting layer.

8. A microlens array comprising:

a first light transmitting layer having a plurality of recessed parts and partitions delimiting the recessed parts, at least a portion of an inner surface of each recessed part being a lens surface; and a plurality of laterally spaced apart second light transmitting layers respectively formed in the recessed parts such that the second light transmitting layers avoid the partitions of the first light transmitting layer, wherein surfaces of the second light transmitting layers opposite the portions of the inner surfaces of the recessed parts form lens surfaces for the respective recessed parts of the first light transmitting layer, wherein the lens surfaces formed at the recessed parts of the first light transmitting layer are convex.

9. A microlens array comprising:

a first light transmitting layer having a plurality of recessed parts and partitions delimiting the recessed parts, at least a portion of an inner surface of each recessed part being a lens surface; and a plurality of laterally spaced apart second light transmitting layers respectively formed in the recessed parts such that the second light transmitting layers avoid the partitions of the first light transmitting layer, wherein surfaces of the second light transmitting layers opposite the portions of the inner surfaces of the recessed parts form lens surfaces for the respective recessed parts of the first light transmitting layer, wherein each of the recessed parts of the first light transmitting layer has a bottom functioning as a convex lens surface and a wall extending from the bottom.

10. A microlens array comprising:

a first light transmitting layer having a plurality of recessed parts and partitions delimiting the recessed parts, at least a portion of an inner surface of each recessed part being a lens surface; and second light transmitting layers respectively formed in the recessed parts such that the second light transmitting layers avoid the partitions of the first light transmitting layer, wherein surfaces of the second light transmitting layers form lens surfaces for the respective recessed parts of the first light transmitting layer;

wherein each lens surface of the first light transmitting layer has a smaller width than a width of each lens surface of the second light transmitting layers.

* * * * *